US008947405B2

(12) United States Patent
Cho et al.

(10) Patent No.: US 8,947,405 B2
(45) Date of Patent: Feb. 3, 2015

(54) ELECTROMAGNETIC STYLUS AND COMPUTER APPARATUS THEREOF

(75) Inventors: Chu-Shun Cho, New Taipei (TW);
Pei-Chen Chin, New Taipei (TW);
Wen-Chin Wu, New Taipei (TW);
Pin-Hsien Su, New Taipei (TW);
Ming-Hua Hung, New Taipei (TW);
Chuan-Cheng Fu, New Taipei (TW)

(73) Assignee: Wistron Corporation, New Taipei (TW)

( * ) Notice: Subject to any disclaimer, the term of this patent is extended or adjusted under 35 U.S.C. 154(b) by 311 days.

(21) Appl. No.: 13/602,325

(22) Filed: Sep. 4, 2012

(65) Prior Publication Data

US 2013/0141399 A1 Jun. 6, 2013

(30) Foreign Application Priority Data

Dec. 6, 2011 (TW) ............................. 100144801 A

(51) Int. Cl.
*G06F 3/033* (2013.01)
(52) U.S. Cl.
USPC ........................................ 345/179; 178/19.03
(58) Field of Classification Search
CPC ...... G06F 3/033; G06F 3/03545; G06F 3/045
USPC ............ 345/156, 173, 179; 178/19.01, 19.03; 401/258
See application file for complete search history.

(56) References Cited

U.S. PATENT DOCUMENTS

| 5,895,895 | A * | 4/1999 | Ono et al. | 178/19.03 |
| 8,259,091 | B2 * | 9/2012 | Yeh | 345/179 |
| 8,415,572 | B2 * | 4/2013 | Yang | 178/19.01 |
| 8,674,967 | B2 * | 3/2014 | Fukushima et al. | 345/179 |
| 8,816,993 | B2 * | 8/2014 | Yuan et al. | 345/179 |
| 2001/0038384 | A1 * | 11/2001 | Fukushima et al. | 345/179 |
| 2002/0190823 | A1 * | 12/2002 | Yap | 335/205 |
| 2004/0056850 | A1 | 3/2004 | Jaeger | |
| 2004/0125089 | A1 * | 7/2004 | Chao et al. | 345/179 |
| 2006/0158440 | A1 * | 7/2006 | Ashenbrenner | 345/179 |
| 2008/0055279 | A1 * | 3/2008 | Osada et al. | 345/179 |
| 2008/0099254 | A1 * | 5/2008 | Katsurahira | 178/18.01 |
| 2008/0150916 | A1 * | 6/2008 | Vos | 345/179 |
| 2008/0158165 | A1 * | 7/2008 | Geaghan et al. | 345/173 |

(Continued)

FOREIGN PATENT DOCUMENTS

CN 101782812 A 7/2010

OTHER PUBLICATIONS

Office Action mailed on Feb. 20, 2014 for the Taiwan application No. 100144801, filing date: Dec. 6, 2011, p. 1 line 6-14, p. 2 and p. 3 line 1-25.

*Primary Examiner* — Joe H Cheng
(74) *Attorney, Agent, or Firm* — Winston Hsu; Scott Margo

(57) ABSTRACT

An electromagnetic stylus includes a hollow body, a pen-nib device, an energy transforming device, a circuit board, and an electricity storage device. The pen-nib device is disposed at one end of the hollow body. The energy transforming device is disposed in the hollow body for converting variations in a physical quantity into electrical signals. The circuit board is disposed in the hollow body and electrically connected to the energy transforming device for rectifying the electrical signals transformed by the energy transforming device. The electricity storage device is disposed in the hollow body and electrically connected to the pen-nib device, for receiving the electrical signals transmitted from the circuit board to generate electrical energy and providing the electrical energy to the pen-nib device to generate electromagnetic signals.

18 Claims, 11 Drawing Sheets

(56) References Cited

U.S. PATENT DOCUMENTS

| | | | |
|---|---|---|---|
| 2010/0038152 A1* | 2/2010 | Kaneda et al. | 178/18.07 |
| 2010/0053113 A1* | 3/2010 | Wu et al. | 345/174 |
| 2010/0263945 A1* | 10/2010 | Mao et al. | 178/19.01 |
| 2011/0007037 A1* | 1/2011 | Ogawa | 345/179 |
| 2011/0084846 A1* | 4/2011 | Li et al. | 340/636.15 |
| 2011/0175854 A1* | 7/2011 | Lien et al. | 345/179 |
| 2011/0297457 A1* | 12/2011 | Yeh et al. | 178/19.01 |
| 2011/0297458 A1* | 12/2011 | Mao et al. | 178/19.04 |
| 2012/0068975 A1* | 3/2012 | Wei et al. | 345/179 |
| 2012/0133327 A1* | 5/2012 | Lee | 320/114 |
| 2012/0182270 A1* | 7/2012 | Hsu | 345/179 |
| 2012/0218232 A1* | 8/2012 | Hsu | 345/179 |

* cited by examiner

ELECTROMAGNETIC STYLUS AND COMPUTER APPARATUS THEREOF

BACKGROUND OF THE INVENTION

1. Field of the Invention

The present invention relates to an electromagnetic stylus, and more specifically, to an electromagnetic stylus having an energy transforming device capable of converting variations in a physical quantity into electrical signals.

2. Description of the Prior Art

A conventional electromagnetic stylus is to utilize an electromagnetic induction method for performing touch operations. Generally, the electromagnetic stylus is an electromagnetic signal transmitting terminal and an electromagnetic sensor in a touch panel is an electromagnetic signal receiving terminal. When the electromagnetic stylus approaches the touch panel, the touch panel can calculate a touch position of the electromagnetic stylus according to variation of magnetic flux sensed by the electromagnetic sensor. Technology of driving the electromagnetic stylus to generate electromagnetic signals may be divided into two types: a passive induction method and an active induction method.

The major advantage of the passive induction method is that there is no need to install a battery into the electromagnetic stylus. The passive induction method involves utilizing a resonance circuitry in the electromagnetic stylus to receive and store alternating electromagnetic energy emitted by an antenna of a digital panel, and then transmit corresponding electromagnetic signals back to the digital panel for positioning of the electromagnetic stylus. However, the energy transforming efficiency between the digital panel and the electromagnetic stylus is lower than 0.5%.

On the other hand, the active induction method involves installing a battery into the electromagnetic stylus to provide the electromagnetic stylus with sufficient electrical energy for emitting electromagnetic signals. Accordingly, the electromagnetic stylus can actively emit electromagnetic signals to an X/Y-axis antenna array on a digital panel for positioning. However, in the active induction method, the volume and weight of the electromagnetic stylus may be increased due to installation of the battery. Furthermore, the battery changing operation may also cause a user much inconvenience.

SUMMARY OF THE INVENTION

The present invention provides an electromagnetic stylus including a hollow body, a pen-nib device, an energy transforming device, a circuit board, and an electricity storage device. The pen-nib device is disposed at one end of the hollow body. The energy transforming device is disposed in the hollow body for converting variations in a physical quantity into electrical signals. The circuit board is disposed in the hollow body and electrically connected to the energy transforming device for rectifying the electrical signals transformed by the energy transforming device. The electricity storage device disposed in the hollow body and electrically connected to the pen-nib device and the circuit board, for receiving the electrical signals transmitted from the circuit board to generate electrical energy and providing the electrical energy to the pen-nib device to generate electromagnetic signals.

The present invention further provides a computer apparatus including a computer module and an electromagnetic stylus. The computer module includes a casing, a host device, at least one heat dissipating sheet, and a heat conductive strip. The casing has a containing slot. The host device is disposed in the casing. The heat dissipating sheet is disposed on the host device. The heat conductive strip is disposed on the heat dissipating sheet. The electromagnetic stylus is detachably disposed in the containing slot. The electromagnetic stylus includes a hollow body, a pen-nib device, a thermal energy conversion chip, a circuit board, and an electricity storage device. The hollow body includes a heat dissipating casing, a heat absorbing casing, and a heat insulation ring. The heat absorbing casing is for contacting the heat conductive strip when the electromagnetic stylus is disposed in the containing slot, so as to receive thermal energy transmitted from the heat dissipating sheet via the heat conductive strip. The heat insulation ring is disposed on the heat absorbing casing and the heat dissipating casing for preventing the heat absorbing casing from contacting the heat dissipating casing. The pen-nib device is disposed on an end of the heat absorbing casing. The thermal energy conversion chip is disposed between the heat absorbing casing and the heat dissipating casing, for absorbing thermal energy generated by temperature difference between the heat absorbing casing and the heat dissipating casing to generate electrical signals. The circuit board is disposed in the hollow body and electrically connected to the thermal energy conversion chip for rectifying the electrical signals transformed by the thermal energy conversion chip. The electricity storage device is disposed in the hollow body and electrically connected to the pen-nib device and the circuit board, for receiving the electrical signals transmitted from the circuit board to generate electrical energy and providing the electrical energy to the pen-nib device to generate electromagnetic signals.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
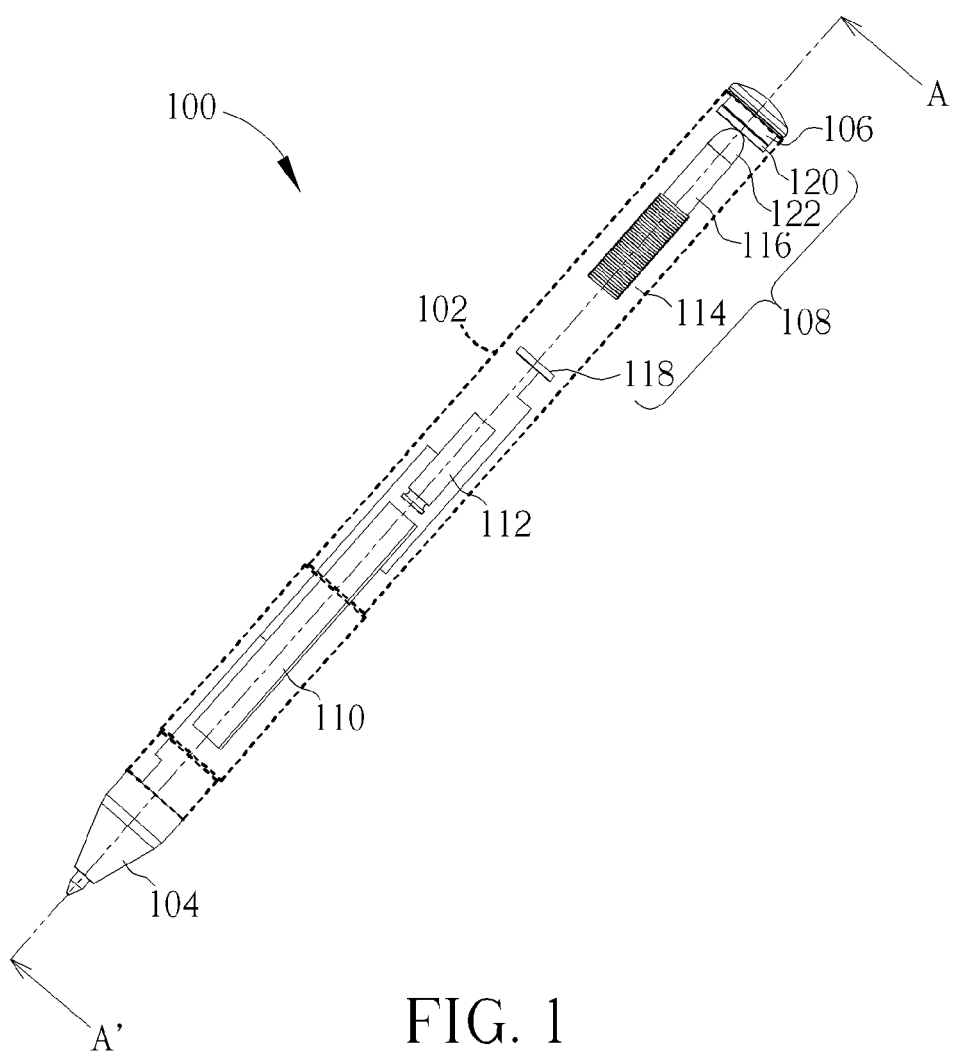
FIG. 1 is a diagram of an electromagnetic stylus according to a first embodiment of the present invention.

Please refer to FIG. 1, which is a diagram of an electromagnetic stylus 100 according to a first embodiment of the present invention. The electromagnetic stylus 100 includes a hollow body 102, a pen-nib device 104, a cap 106, an energy transforming device 108, a circuit board 110, and an electricity storage device 112. The hollow body 102 is depicted briefly by dotted lines in FIG. 1 for clearly displaying inner components of the electromagnetic stylus 100. The pen-nib device 104 and the cap 106 are disposed on two ends of hollow body 102 respectively for containing the inner components (e.g. the energy transforming device 108, the circuit board 110, and the electricity storage device 112) of the electromagnetic stylus 100 cooperatively with the hollow body 102. The circuit board 110 is disposed in the hollow body 102 and electrically connected to the energy transforming device 108. The circuit board 110 is used for rectifying electrical signals transformed by the energy transforming device 108, in other words, converting alternative currents generated from the energy transforming device 108 into direct currents. The electricity storage device 112 is disposed in the hollow body 102 and electrically connected to the pen-nib device 104 and the circuit board 110. The electricity storage device 112 is used for receiving the electrical signals transmitted from the circuit board 110 to generate electrical energy and providing the electrical energy to the pen-nib device 104 to generate electromagnetic signals. The electricity storage device 112 can be a capacitance device. As for the signal emitting design of the pen-nib device 104, its related description is commonly seen in the prior art and therefore omitted herein for simplicity.

Figure 2:
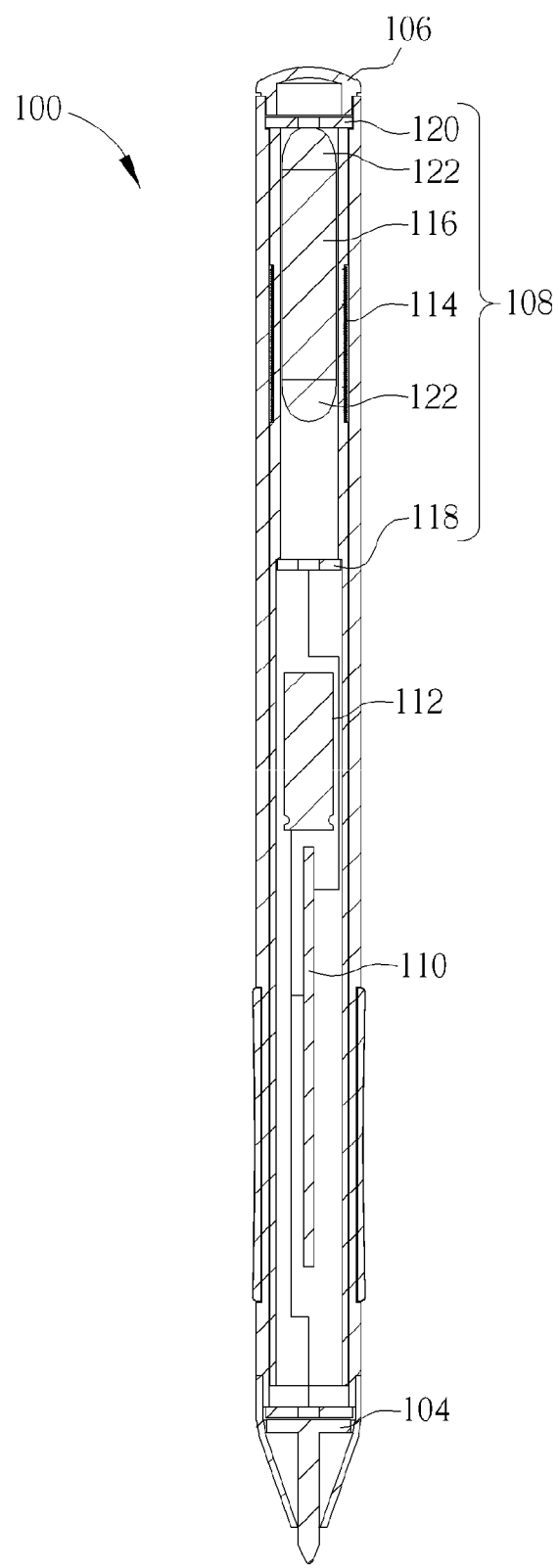
FIG. 2 is a sectional diagram of the electromagnetic stylus in FIG. 1 along a sectional line A-A'.

In this embodiment, the energy transforming device 108 is used for transforming dynamic energy into the electrical signals. More detailed description for the energy transforming design of the energy transforming device 108 is provided as follows. Please refer to FIG. 1 and FIG. 2. FIG. 2 is a sectional diagram of the electromagnetic stylus 100 in FIG. 1 along a sectional line A-A'. The energy transforming device 108 is disposed in the hollow body 102. The energy transforming device 108 includes a coil 114, a magnet 116, a first piezoelectric sheet 118, and a second piezoelectric sheet 120. The coil 114 is electrically connected to the circuit board 110. The magnet 116 is movably disposed in the coil 114 for moving back and forth relative to the coil 114 to make the coil 114 generate the electrical signals. The first piezoelectric sheet 118 and the second piezoelectric sheet 120 are disposed on the hollow body 102 corresponding to two ends of the coil 114. The first piezoelectric sheet 118 and the second piezoelectric sheet 120 are made of conventional piezoelectric material (e.g. $Pb(ZrTi)O_3$, PZT) with a high piezoelectric coupling coefficient and a dielectric constant. When the piezoelectric material receives an external stress or a deformation stress, polarization may occur within and then an electric field or electric displacement may be generated accordingly between two conductive surfaces of the piezoelectric material. As a result, the surface of the piezoelectric material starts to produce induced charges so that the piezoelectric material may generate the electrical signals. In other words, the first piezoelectric sheet 118 and the second piezoelectric sheet 120 can be used for receiving impact of the magnet 116 (i.e. an external stress) to generate the electrical signals.

Furthermore, for preventing damage of the first piezoelectric sheet 118 and the second piezoelectric sheet 120 due to excessive impact of the magnet 116, the energy transforming device 108 can further include at least one buffer member 122. In this embodiment, the energy transforming device 108 can include two buffer members 122 respectively disposed on two ends of the magnet 116. The buffer member 122 can be a rubber buffer pad, but not limited thereto, meaning that the buffer member 122 can be other component having a buffer function, such as a spring. Accordingly, the buffer member 122 can provide a buffer function when the magnet 116 hits the first piezoelectric sheet 118 and the second piezoelectric sheet 120, so as to prevent damage of the first piezoelectric sheet 118 and the second piezoelectric sheet 120. To be noted, if the energy transforming device 108 utilizes the design in which the buffer member 122 is a spring, the buffer member 122 can further provide the magnet 116 with elastic force to move back and forth in the coil 114 more rapidly during the process of the magnet 116 hitting the first piezoelectric sheet 118 and the second piezoelectric sheet 120, so that the energy generating efficiency of the energy transforming device 108 can be increased accordingly.

Via the said disposition, when a user wants to recharge the electromagnetic stylus 100, the user just needs to shake the electromagnetic stylus 100 upward and downward to make the magnet 116 move back and forth relative to the coil 114 and hit the first piezoelectric sheet 118 and the second piezoelectric sheet 120. When the magnet 116 moves back and forth relative to the coil 114, the magnet 116 drives the coil 114 to generate the electrical signals due to variation of magnet flux of the coil 114. Furthermore, when the magnet 116 hits the first piezoelectric sheet 118 and the second piezoelectric sheet 120, the first piezoelectric sheet 118 and the second piezoelectric sheet 120 can generate the electrical signals accordingly.

In summary, via the design in which the magnet 116 moves back and forth relative to the coil 114 and hits the first piezoelectric sheet 118 and the second piezoelectric sheet 120, the coil 114, the first piezoelectric sheet 118, and the second piezoelectric sheet 120 can provide the electrical signals to the circuit board 110 continuously. After the circuit board 110 rectifies the received electrical signals, the electrical signals generated by the coil 114, the first piezoelectric sheet 118, and the second piezoelectric sheet 120 can be converted from alternative current signals into direct current signals and then transmitted to the electricity storage device 112 so as to generate the electrical energy. Accordingly, when the user wants to use the electromagnetic stylus 100 for touch operations, the electricity storage device 112 can provide the pen-nib device 104 with the electrical energy to generate electromagnetic signals. In such a manner, via the design in which the energy transforming device 108 transforms dynamic energy into electrical signals and the said shaking operation, the electromagnetic stylus 100 can generate electrical energy by itself without additional installation of a battery, so as to achieve the purpose of reducing the volume and weight of the electromagnetic stylus 100 and omitting the subsequent battery changing operation. Thus, convenience of the electromagnetic stylus 100 in use can be improved.

Figure 3:
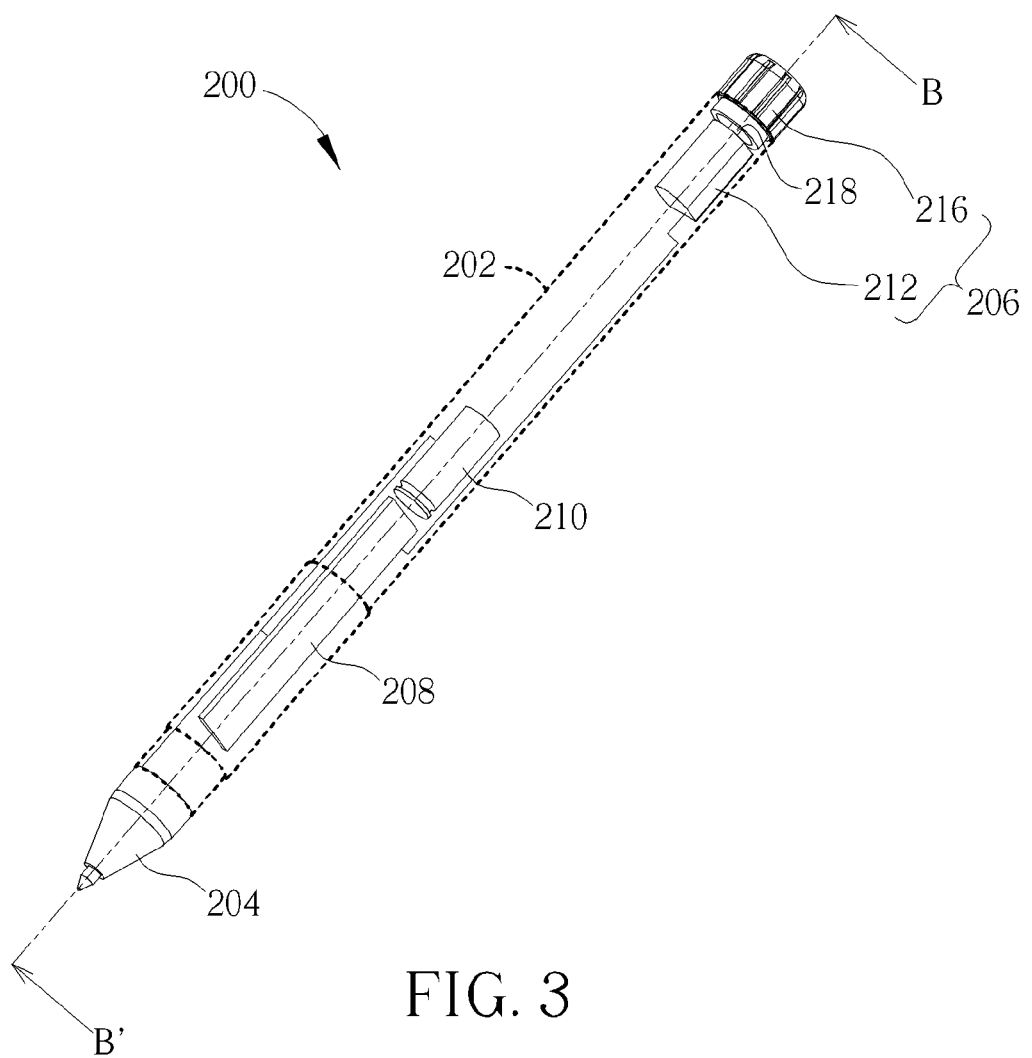
FIG. 3 is a diagram of an electromagnetic stylus according to a second embodiment of the present invention.

Please refer to FIG. 3, which is a diagram of an electromagnetic stylus 200 according to a second embodiment of the present invention. The electromagnetic stylus 200 includes a hollow body 202, a pen-nib device 204, an energy transforming device 206, a circuit board 208, and an electricity storage device 210. The hollow body 202 is depicted briefly by dotted lines in FIG. 3 for clearly displaying inner components of the electromagnetic stylus 200. In this embodiment, since the structures of the hollow body 202, the pen-nib device 204, the circuit board 208, and the electricity storage device 210 are similar to the structures of the hollow body 102, the pen-nib device 104, the circuit board 110, and the electricity storage device 112, the related description is omitted herein for simplicity. Thus, only the energy transforming design of the energy transforming device 206 is described in details as follows.

Figure 4:
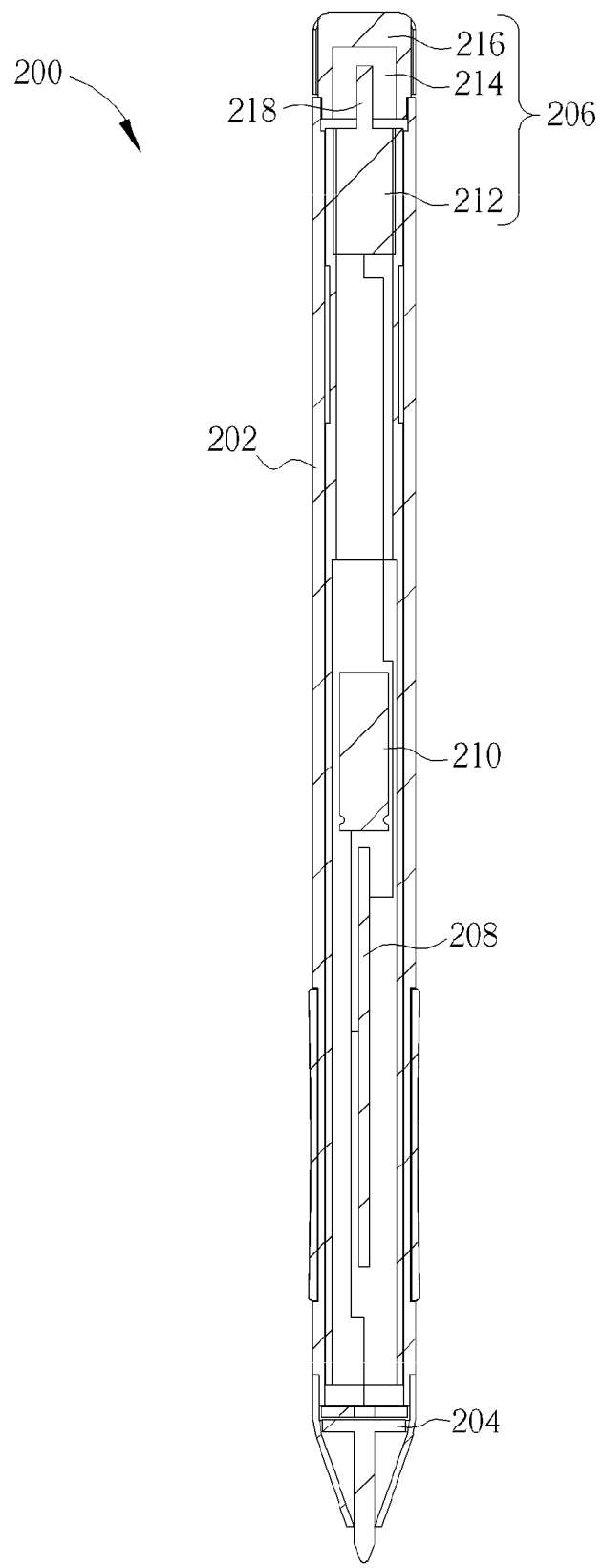
FIG. 4 is a sectional diagram of the electromagnetic stylus in FIG. 3 along a sectional line B-B'.

Please refer FIG. 3 and FIG. 4. FIG. 4 is a sectional diagram of the electromagnetic stylus 200 in FIG. 3 along a sectional line B-B'. The energy transforming device 206 is disposed in the hollow body 202. The energy transforming device 206 includes an energy generating motor 212, a mass 214, and a friction cap 216. The energy generating motor 212 is electrically connected to the circuit board 208 and has a rotating shaft 218 for generating electrical signals by electromagnetic induction in a manner of rotating the rotating shaft 218. The mass 214 is disposed on the rotating shaft 218. The friction cap 216 is disposed on the mass 214 and rotatably disposed on another end of the hollow body 202 opposite to the pen-nib device 204 for driving the mass 214 to rotate the rotating shaft 218, so as to drive the energy generating motor 212 to generate the electrical signals. The friction cap 216 is made of material having a high friction coefficient (e.g. rubber), but not limited thereto.

Via the said disposition, when a user wants to recharge the electromagnetic stylus 200, the user just needs to utilize the friction cap 216 to scratch a planar surface (e.g. a tabletop) back and forth. Accordingly, friction force generated between the friction cap 216 and the planar surface can drive the mass 214 to rotate the rotating shaft 218, so as to make the energy generating motor 212 generate the electrical signals. Since the rotating inertia of the mass 214 can increase the rotating times of the rotating shaft 218, the mass 214 can further improve the energy generating efficiency of the energy transforming device 206. To be noted, the mass 214 can be an omissible component for simplifying the mechanical design of the energy transforming device 206. Subsequently, after the circuit board 208 rectifies the received electrical signals, the electrical signals generated by the energy generating motor 212 can be converted from alternative current signals into direct current signals and then transmitted to the electricity storage device 210 so as to generate electrical energy. Accordingly, when the user wants to use the electromagnetic stylus 200 for touch operations, the electricity storage device 210 can provide the pen-nib device 204 with the electrical energy to generate electromagnetic signals.

In such a manner, via the design in which the energy transforming device 206 transforms dynamic energy into electrical signals and the said scratching operation, the electromagnetic stylus 200 can generate electrical energy by itself without additional installation of a battery, so as to achieve the purpose of reducing the volume and weight of the electromagnetic stylus 200 and omitting the subsequent battery changing operation. Thus, convenience of the electromagnetic stylus 200 in use can be improved.

Figure 5:
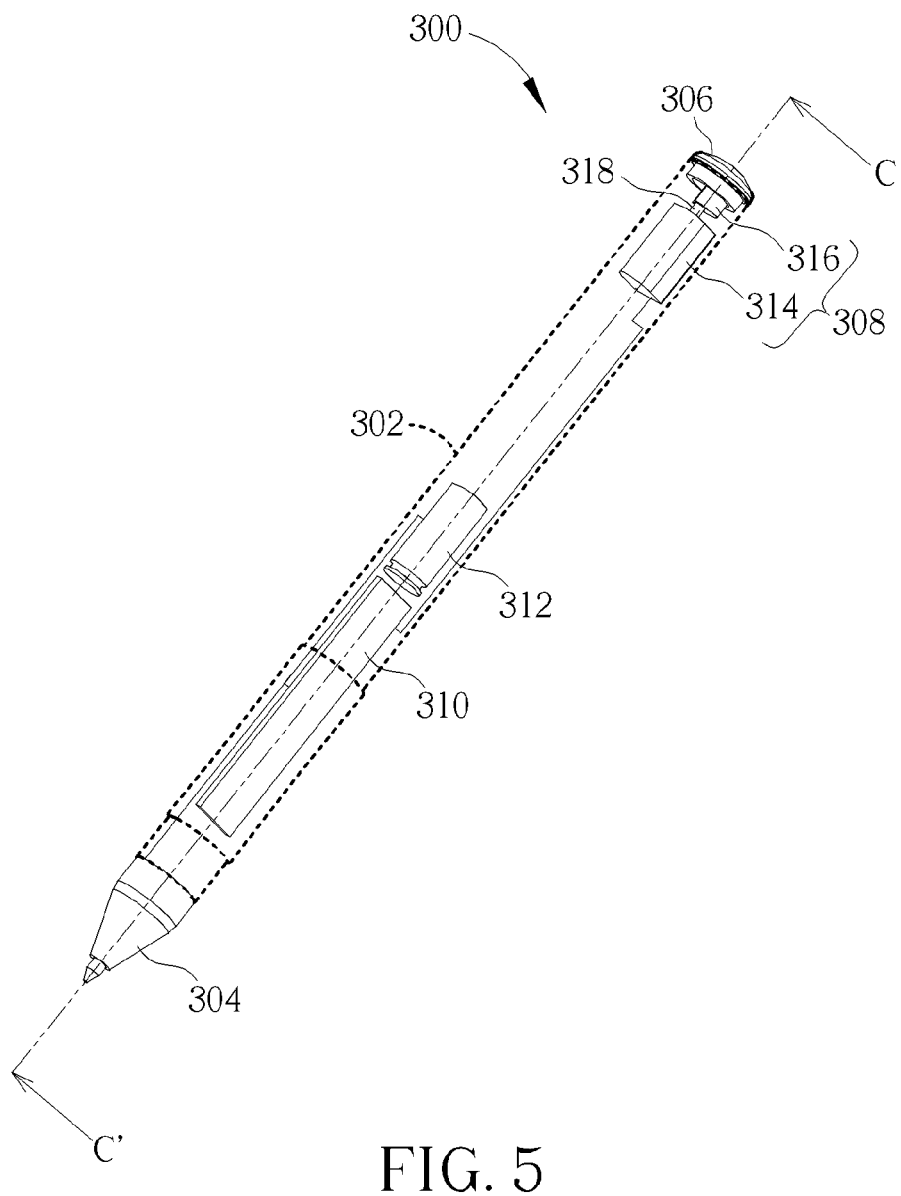
FIG. 5 is a diagram of an electromagnetic stylus according to a third embodiment of the present invention.

Please refer to FIG. 5, which is a diagram of an electromagnetic stylus 300 according to a third embodiment of the present invention. The electromagnetic stylus 300 includes a hollow body 302, a pen-nib device 304, a cap 306, an energy transforming device 308, a circuit board 310, and an electricity storage device 312. The hollow body 302 is depicted briefly by dotted lines in FIG. 5 for clearly displaying inner components of the electromagnetic stylus 300. In this embodiment, since the structures of the hollow body 302, the pen-nib device 304, the cap 306, the circuit board 310, and the electricity storage device 312 are similar to the structures of the hollow body 102, the pen-nib device 104, the cap 106, the circuit board 110, and the electricity storage device 112, the related description is omitted herein for simplicity. Thus, only the energy transforming design of the energy transforming device 308 is described in details as follows.

Figure 6:
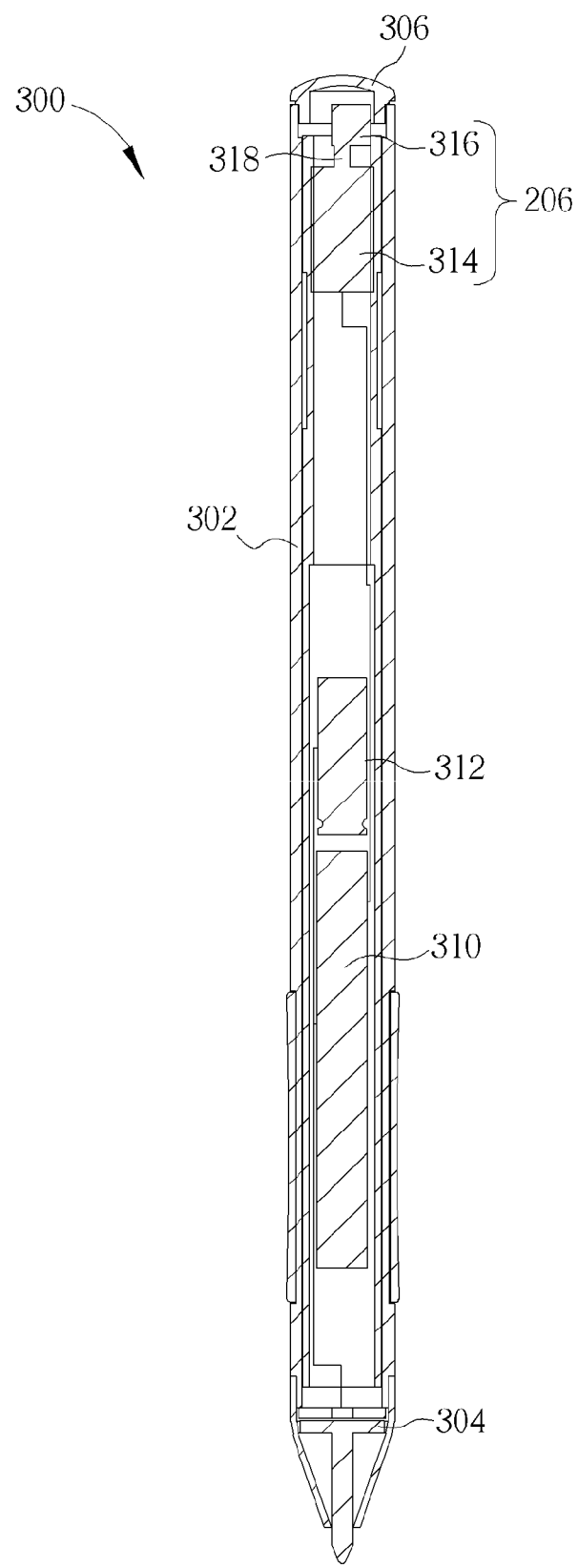
FIG. 6 is a sectional diagram of the electromagnetic stylus in FIG. 5 along a sectional line C-C'.

Please refer FIG. 5 and FIG. 6. FIG. 6 is a sectional diagram of the electromagnetic stylus 300 in FIG. 5 along a sectional line C-C'. The energy transforming device 308 is disposed in the hollow body 302. The energy transforming device 308 includes an energy generating motor 314 and an eccentric mass 316. The energy generating motor 314 is electrically connected to the circuit board 310 and has a rotating shaft 318 for generating electrical signals by electromagnetic induction in a manner of rotating the rotating shaft 318. The eccentric mass 316 is disposed on the rotating shaft 318. Accordingly, the energy generating motor 314 can generate the electrical signals by utilizing the eccentric mass 316 to drive the rotating shaft 318 or rotating relative to the eccentric mass 316 via the rotating shaft 318 with rotation of the hollow body 302.

Via the said disposition, when a user wants to recharge the electromagnetic stylus 300, the user just needs to push the electromagnetic stylus 300 to roll on a holding planar/inclined surface (e.g. a tabletop). During this process, since the eccentric mass 316 can hold still due to the gravity while the hollow body 302 is rotating, the energy generating motor 314 can generate the electrical signals by rotating relative to the eccentric mass 316 via the rotating shaft 318 with rotation of the hollow body 302. Besides, the user can also keep rotating the electromagnetic stylus 300 toward the same direction. At this time, the eccentric mass 316 can drive the rotating shaft 318 to rotate due to centrifugal force, so as to make the energy generating motor 314 generate the electrical signals.

In such a manner, via the design in which the energy transforming device 308 transforms dynamic energy into the electrical signals and the said rolling or rotating operation, the electromagnetic stylus 300 can generate electrical energy by itself without additional installation of a battery, so as to achieve the purpose of reducing the volume and weight of the electromagnetic stylus 300 and omitting the subsequent battery changing operation. Thus, convenience of the electromagnetic stylus 300 in use can be improved.

Figure 7:
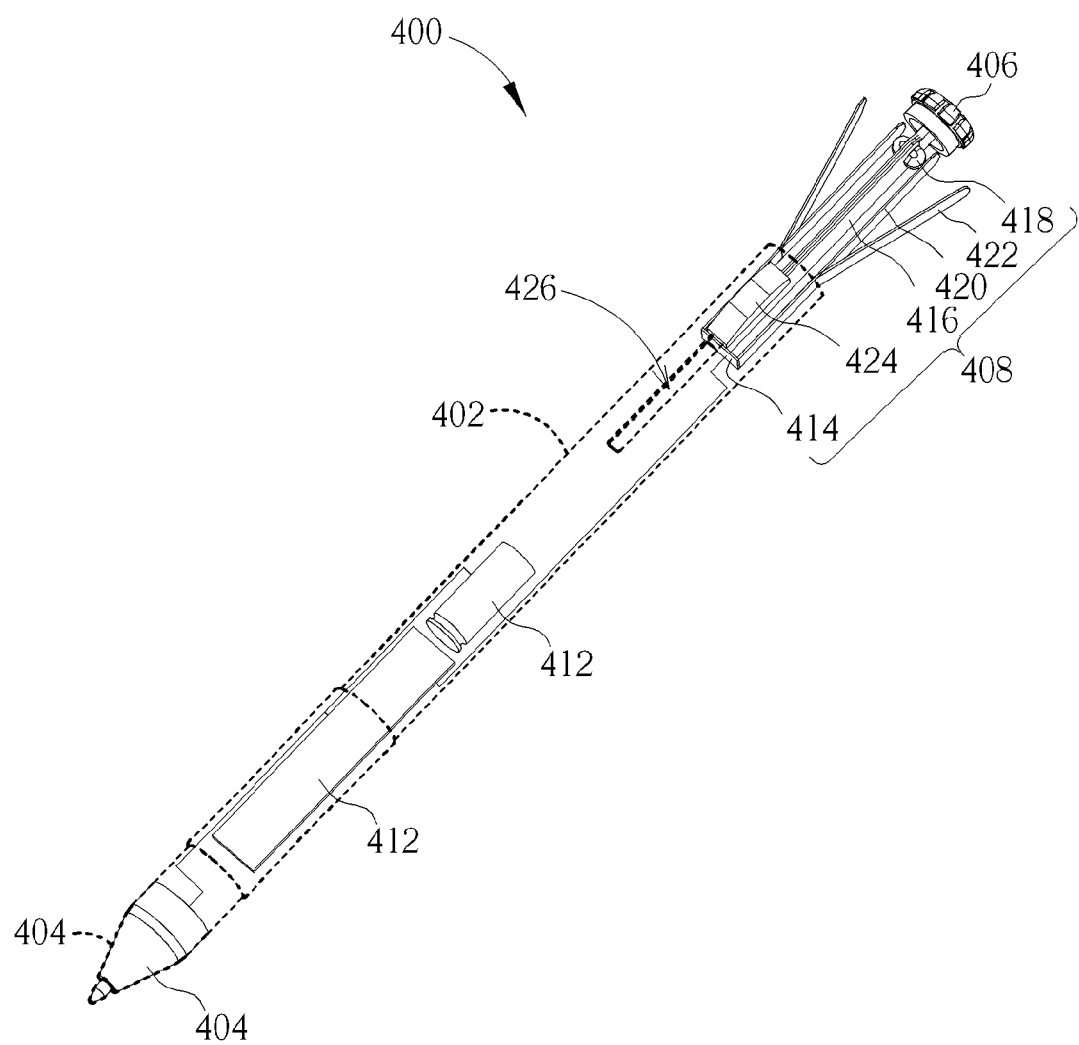
FIG. 7 is a diagram of an electromagnetic stylus according to a fourth embodiment of the present invention.

Please refer to FIG. 7, which is a diagram of an electromagnetic stylus 400 according to a fourth embodiment of the present invention. The electromagnetic stylus 400 includes a hollow body 402, a pen-nib device 404, a cap 406, an energy transforming device 408, a circuit board 410, and an electricity storage device 412. The hollow body 402 is depicted briefly by dotted lines in FIG. 7 for clearly displaying inner components of the electromagnetic stylus 400. In this embodiment, since the structures of the hollow body 402, the pen-nib device 404, the cap 406, the circuit board 410, and the electricity storage device 412 are similar to the structures of the hollow body 102, the pen-nib device 104, the cap 106, the circuit board 110, and the electricity storage device 112, the related description is omitted herein for simplicity. Thus, only the energy transforming design of the energy transforming device 408 is described in detail as follows.

Figure 8:
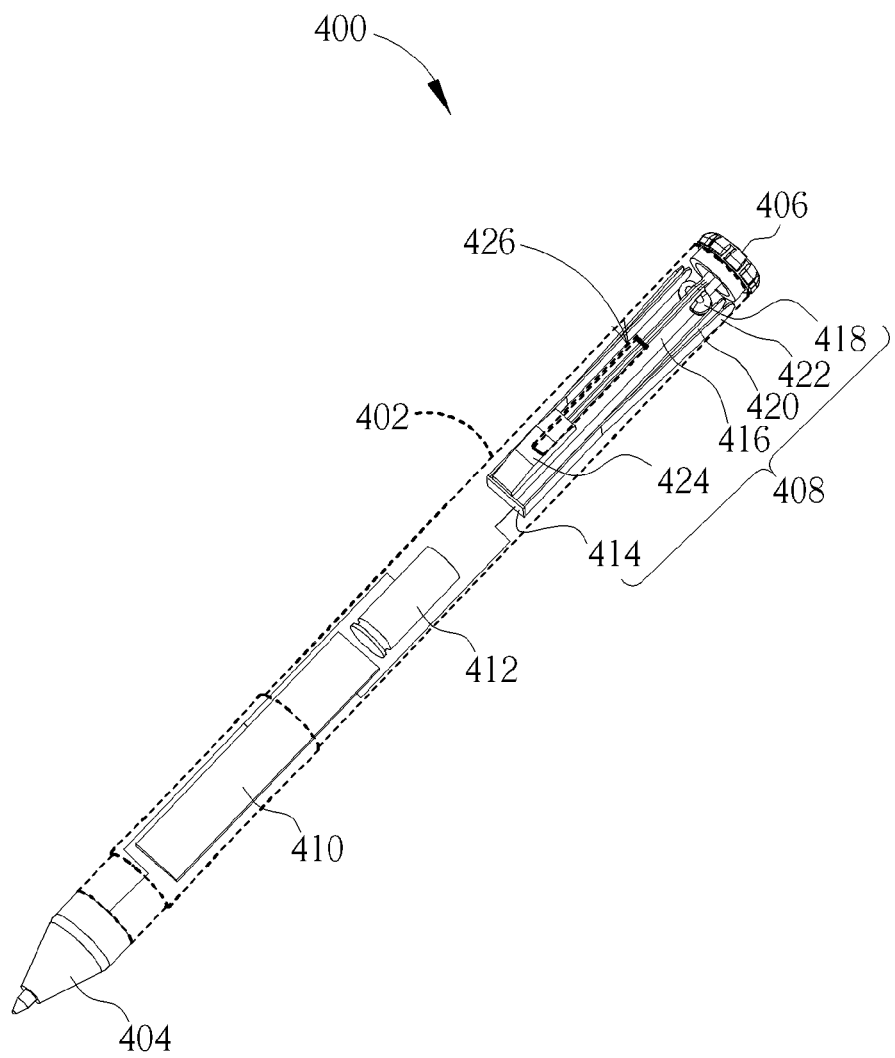
FIG. 8 is a diagram of the electromagnetic stylus in FIG. 7 when an energy transforming device is contained in a hollow body.

Please refer FIG. 7 and FIG. 8. FIG. 8 is a diagram of the electromagnetic stylus 400 in FIG. 7 when the energy transforming device 408 is contained in the hollow body 402. The energy transforming device 408 can protrude from the hollow body 402 or be contained in the hollow body 402. The energy transforming device 408 includes a support base 414, at least one first piezoelectric strip 416 (two shown in FIG. 7 and FIG. 8 respectively), at least one mass 418 (one disposed on each first piezoelectric strip 416 in FIG. 7 and FIG. 8 respectively), at least one second piezoelectric strip 420 (two shown in FIG. 7 and FIG. 8 respectively), at least one elastic strip 422 (two shown in FIG. 7 and FIG. 8 respectively), and a push button 424.

The support base 414 is disposed in the hollow body 402. The first piezoelectric strip 416 is disposed on the support base 414 and electrically connected to the circuit board 410. The mass 418 is disposed on a top end of the first piezoelectric strip 416 for driving the first piezoelectric strip 416 to swing relative to the support base 414 to generate electrical signals. In this embodiment, the elastic strip 422 is disposed on the support base 414 in a manner of bending outwardly relative to the first electromagnetic strip 416 (as shown in FIG. 7) and located at two sides of the first electromagnetic strip 416 for providing elastic force to the mass 418, so that the swing times of the first piezoelectric strip 418 can be increased accordingly. The second piezoelectric strip 420 is disposed on the support base 414, electrically connected to the circuit board 410 and located between the first piezoelectric strip 416 and the elastic strip 422 for receiving impact of the mass 418. In such a manner, the second piezoelectric strip 420 can be swing relative to the support base 414 together with the first piezoelectric strip 416, so as to generate the electrical signals. Furthermore, as shown in FIG. 7 and FIG. 8, in this embodiment, a sliding slot 426 is formed on the hollow body 402 corresponding to the push button 424. The push button 424 is connected to the support base 414 and movably disposed on the sliding slot 426 for pushing the support base 414 along the sliding slot 426, so as to make the first piezoelectric strip 416, the mass 418, the second piezoelectric strip 420, and the elastic strip 422 protrude from the hollow body 402 (as shown in FIG. 7) or be contained in the hollow body 402 (as shown in FIG. 8).

Via the said disposition, when a user has no need to utilize the electromagnetic stylus 400, the user can just push the push button 424 to move along the sliding slot 426, so as to drive the support base 414 to move to a position as shown in FIG. 8. Accordingly, the first piezoelectric strip 416, the mass 418, the second piezoelectric strip 420, and the elastic strip 422 can be contained in the hollow body 402 (as shown in FIG. 8) for convenient storage or carrying.

On the other hand, when the user wants to recharge the electromagnetic stylus 400, the user just needs to push the push button 424 to move along the sliding slot 426, so that the support base 414 can be moved from the position as shown in FIG. 8 to a position as shown in FIG. 7. Accordingly, the first piezoelectric strip 416, the mass 418, the second piezoelectric strip 420, and the elastic strip 422 can protrude from the hollow body 402 (as shown in FIG. 7). At this time, the elastic strip 422 can be changed from a contained state as shown in FIG. 8 to an extended state as shown in FIG. 7 by its elastic characteristic.

Subsequently, the user can shake the electromagnetic stylus 400 leftward and rightward for utilizing the mass 418 to drive the first piezoelectric strip 416 to swing correspondingly, and then, to drive the second piezoelectric strip 420 to swing with the first piezoelectric strip 416 after the mass 418 hits the second piezoelectric strip 420. Accordingly, the said deformation of the first piezoelectric strip 416 and the second piezoelectric strip 420 can make the first piezoelectric strip 416 and the second piezoelectric strip 420 generate the electrical signals. Furthermore, during said process of the mass 418 driving the first piezoelectric strip 416 and the second piezoelectric strip 420 to swing leftward and rightward, the elastic strip 422 can provide the mass 418 with elastic force when the mass 418 hits the elastic strip 422, so that the mass 418 can swing back and forth between the elastic strips 422 more quickly. In such a manner, the swinging times of the first piezoelectric strip 416 and the second piezoelectric strip 420 can be increased so as to improve the energy generating efficiency of the energy transforming device 408.

To be noted, for further improving the energy generating efficiency of the energy transforming device 408, the elastic strip 422 can be made of elastic piezoelectric material and electrically connected to the circuit board 410. Thus, the elastic strip 422 can generate the electrical signals accordingly after receiving the stress exerted by the mass 418.

In such a manner, via the design in which the energy transforming device 206 transforms dynamic energy into the electrical signals and the said shaking operation, the electromagnetic stylus 200 can generate electrical energy by itself without additional installation of a battery, so as to achieve the purpose of reducing the volume and weight of the electromagnetic stylus 400 and omitting the subsequent battery changing operation. Thus, convenience of the electromagnetic stylus 400 in use can be improved.

It should be mentioned that the design of making the energy transforming device protrude from the hollow body is not limited to the said embodiment. Instead, the present invention can also utilize the design in which the energy transforming device is fixed into the hollow body and the cap is slidable along the hollow body to expose or contain the energy transforming device. As for the sliding design in which the cap is slidable along the hollow body, its description is commonly seen in the prior art and therefore omitted herein. Furthermore, number of the first piezoelectric strips 416, the second piezoelectric strips 420, and the elastic strip 422 is not limited to the said embodiment and depends on the practical application of the electromagnetic stylus 400.

Figure 9:
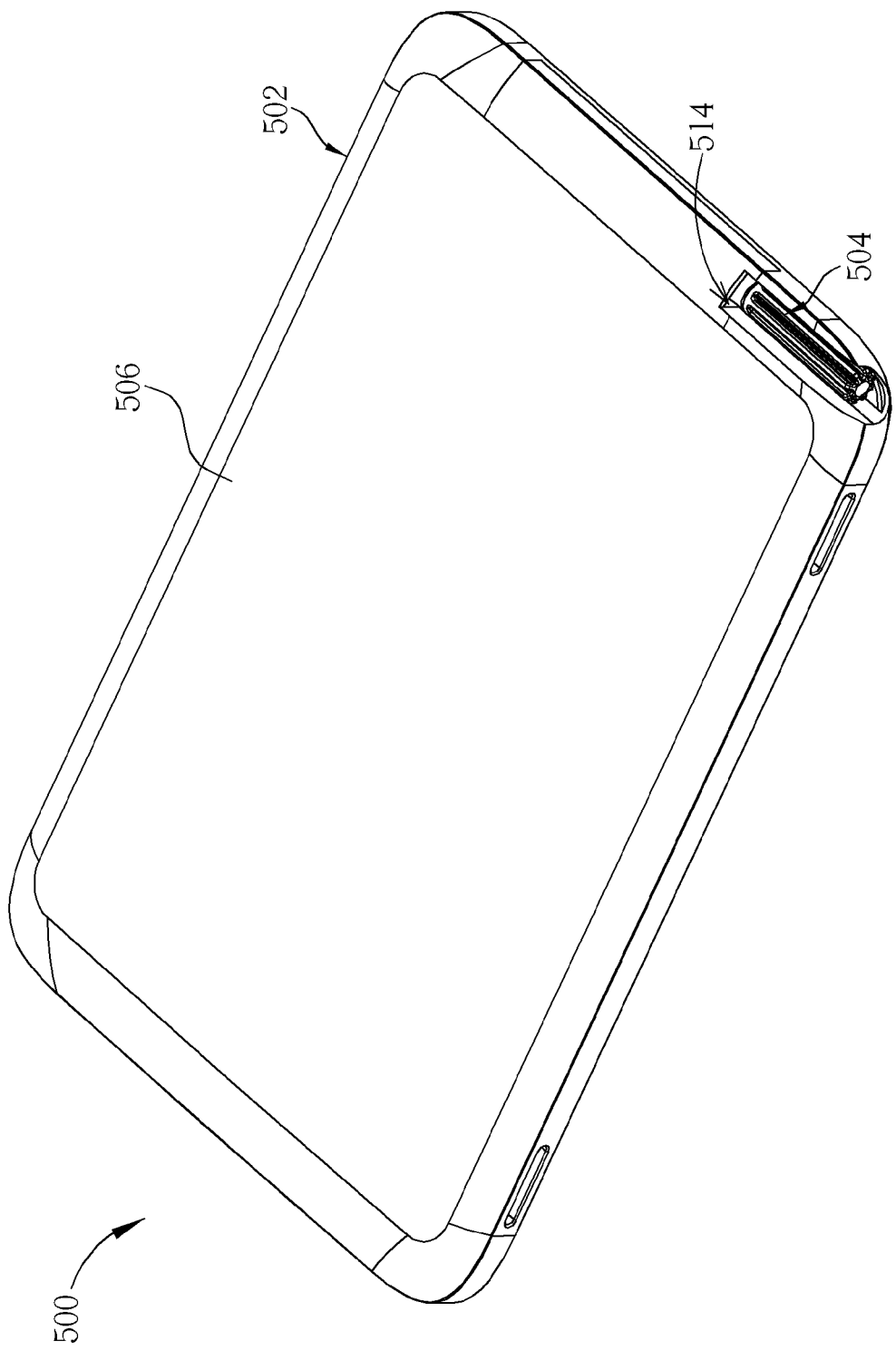
FIG. 9 is a diagram of a computer apparatus according to a fifth embodiment of the present invention.
Figure 10:
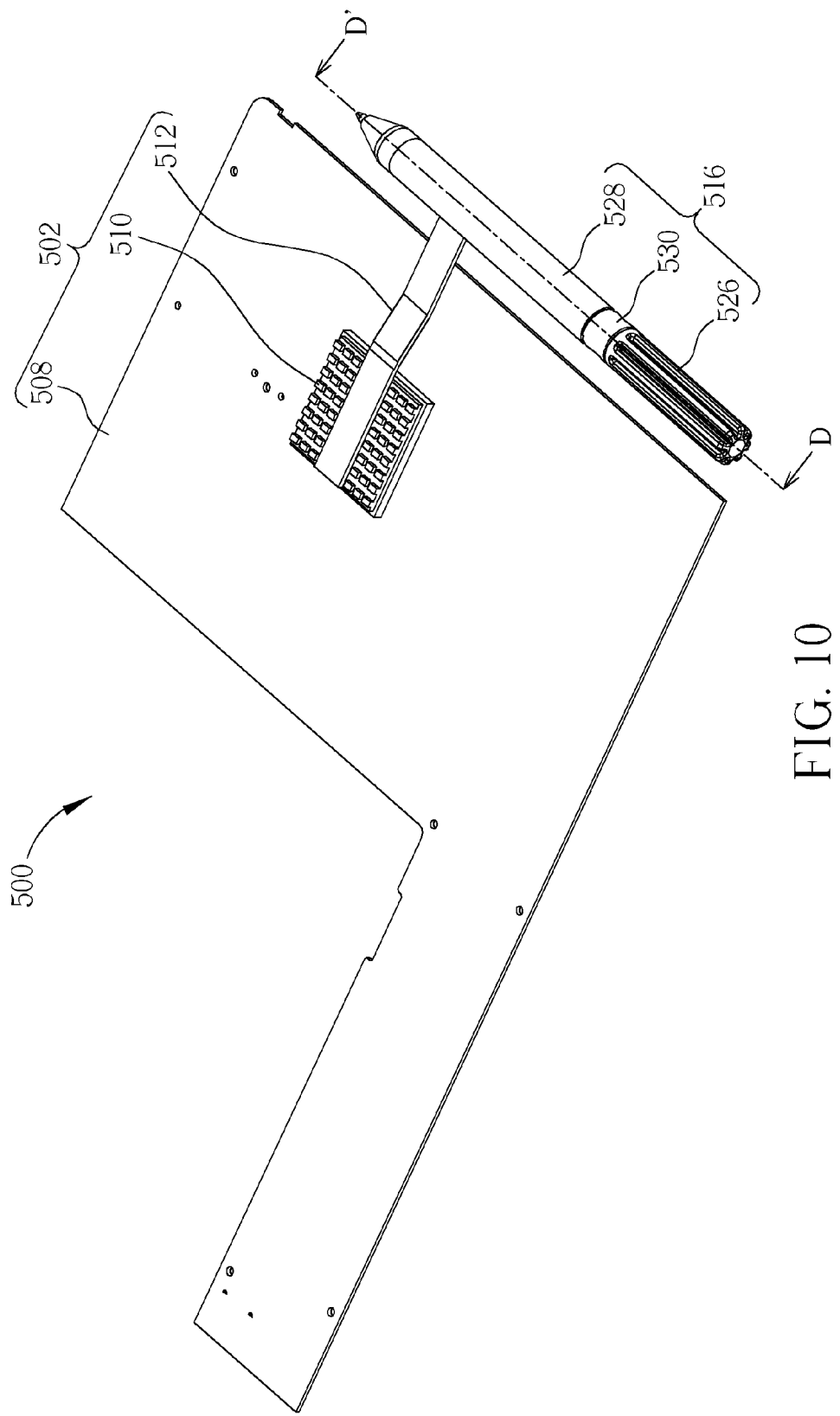
FIG. 10 is an inner diagram of the computer apparatus in FIG. 9.

In the present invention, the energy transforming design of the energy transforming device is not limited to the design of transforming dynamic energy into electrical signals mentioned in the said embodiments. Instead, the present invention can also utilize the design in which the energy transforming device is a thermal energy conversion chip for transforming thermal energy into electrical signals. Please refer to FIG. 9 and FIG. 10. FIG. 9 is a diagram of a computer apparatus 500 according to a fifth embodiment of the present invention. FIG. 10 is an inner diagram of the computer apparatus 500 in FIG. 9. As shown in FIG. 9 and FIG. 10, the computer apparatus 500 includes a computer module 502 and an electromagnetic stylus 504. The computer module 502 can be a conventional desktop computer or portable computer (e.g. a notebook or a tablet computer). For example, the computer module 502 is depicted as a notebook in FIG. 9. The computer module 502 includes a casing 506, a host device 508, at least one heat dissipating sheet 510 (one shown in FIG. 10), and a heat conductive strip 512. The casing 506 has a containing slot 514 for the electromagnetic stylus 504 to be detachably contained therein. The host device 508 can include common components installed in a computer, such as a motherboard and a central processing unit (CPU). The related description is omitted herein since it is commonly seen in the prior art. The heat dissipating sheet 510 is disposed on the host device 508 for heat dissipation. The heat conductive strip 512 is disposed on the heat dissipating sheet 510 for dissipating thermal energy of the host device 508 absorbed by the heat dissipating sheet 510.

Figure 11:
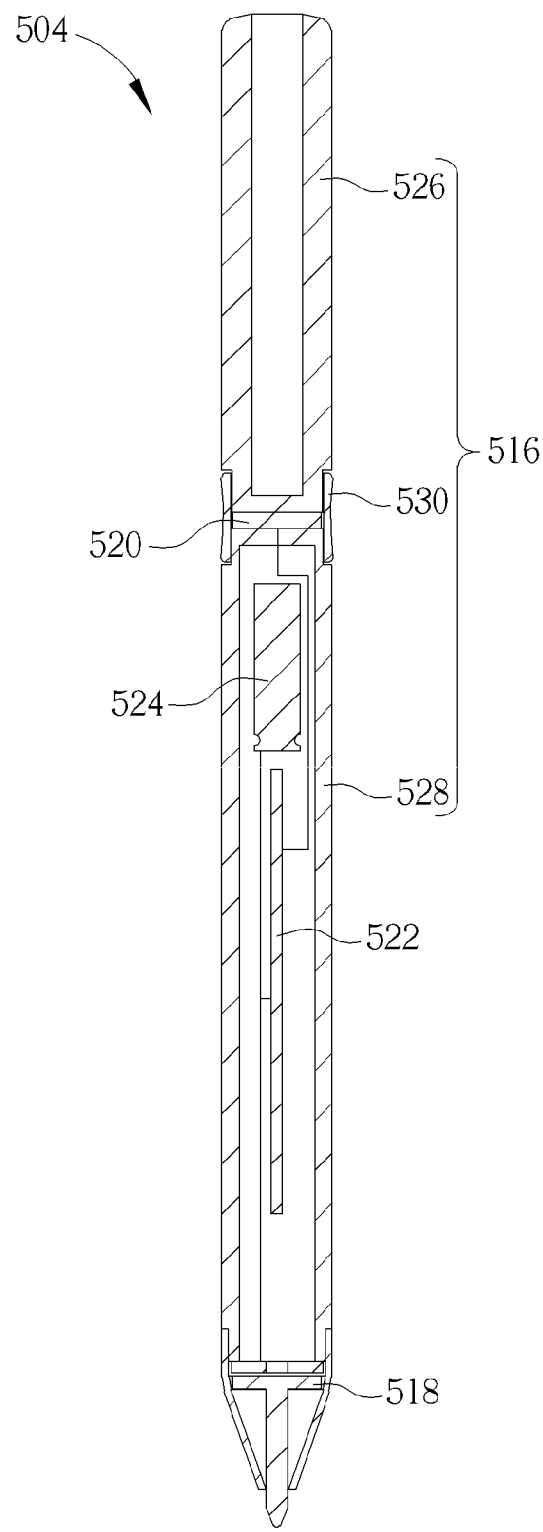
FIG. 11 is a sectional diagram of an electromagnetic stylus in FIG. 10 along a sectional line D-D'.

More detailed description for the energy transforming design of the electromagnetic stylus 504 is provided as follows. Please refer to FIG. 10 and FIG. 11. FIG. 11 is a sectional diagram of the electromagnetic stylus 504 in FIG. 10 along a sectional line D-D'. The electromagnetic stylus 504 includes a hollow body 516, a pen-nib device 518, a thermal energy conversion chip 520, a circuit board 522, and an electricity storage device 524. The hollow body 516 includes a heat dissipating casing 526, a heat absorbing casing 528, and a heat insulation ring 530. The heat absorbing casing 528 is used for contacting the heat conductive strip 512 when the electromagnetic stylus 504 is contained in the containing slot 514, so as to absorb the thermal energy of the host device 512 transmitted by the heat conductive sheet 510. The heat absorbing casing 528 is made of material having a high heat absorbing efficiency (e.g. metal or carbon). The heat dissipating casing is made of material having a high heat dissipating efficiency (e.g. metal). The heat insulation ring 530 is disposed on the heat absorbing casing 528 and the heat dissipating casing 526 for preventing the heat absorbing casing 528 from contacting the heat dissipating casing 526, so as to cause a temperature difference between the heat absorbing casing 528 and the heat dissipating casing 526.

The pen-nib device 518 is disposed on an end of the heat absorbing casing 528. The thermal energy conversion chip 520 is disposed between the heat absorbing casing 528 and the heat dissipating casing 526 for transforming the thermal energy caused by the temperature difference between the heat absorbing casing 528 and the heat dissipating casing 526 into electrical signals. The thermal energy conversion chip 520 utilizes the Seedbeck effect to perform transformation between thermal energy and electrical signals, and the related description is omitted herein since it is commonly seen in the prior art. The circuit board 522 is disposed in the hollow body 516. To be more specific, as shown in FIG. 11, the circuit board 522 is disposed in the heat absorbing casing 528, but is not limited thereto. The circuit board 522 is also electrically connected to the thermal energy conversion chip 520 for rectifying the electrical signals transformed by the thermal energy conversion chip 520. The electricity storage device 524 is disposed in the heat absorbing casing 528 of the hollow body as shown in FIG. 11 (but not limited thereto) and electrically connected to the pen-nib device 518 and the circuit board 522. The electricity storage device 524 is used for receiving the electrical signals transmitted from the circuit board 522 to generate electrical energy and providing the pen-nib device 518 with the electrical energy to generate electromagnetic signals. The electricity storage device 524 can be a capacitance device.

Via the said disposition, when a user wants to recharge the electromagnetic stylus 504, the user just needs to insert the electromagnetic stylus 504 into the containing slot 514. At this time, as mentioned above, the heat absorbing casing 528 contacts the heat conductive strip 512 to absorb the thermal energy of the heat dissipating sheet 510 via the heat conductive strip 512, so that the temperature of the heat absorbing casing 528 can be increased accordingly. Via the said heat absorbing design and the design in which the heat insulation ring 530 prevents the heat absorbing casing 528 from contacting the heat dissipating casing 526, a considerable temperature difference may occur between the heat absorbing casing 528 and the heat dissipating casing 526. In such a manner, the thermal energy conversion chip 520 can generate the electrical signals by the said temperature difference between the heat absorbing casing 528 and the heat dissipating casing 526.

In such a manner, via the design in which the thermal energy conversion chip 520 transforms thermal energy into electrical signals and the said recharging operation, the electromagnetic stylus 504 can generate electrical energy by itself without additional installation of a battery, so as to achieve the purpose of reducing the volume and weight of the electromagnetic stylus 504 and omitting the subsequent battery changing operation. Thus, convenience of the electromagnetic stylus 504 in use can be improved.

To be noted, the recharging operation of the electromagnetic stylus 504 is not limited to the said embodiment. Instead, the present invention can utilize other heating design to increase the temperature of the heat absorbing casing 528, such as holding the heat absorbing casing 528 by the user's hand.

Compared with the prior art, the present invention utilizes the design in which the energy transforming device for converting variations in a physical quantity into electrical signals is disposed in the electromagnetic stylus, to make the electromagnetic stylus capable of generating electrical energy by itself without additional installation of a battery. In such a manner, the purpose of reducing the volume and weight of the electromagnetic stylus and omitting the subsequent battery changing operation can be accordingly achieved, so as to improve convenience of the electromagnetic stylus in use.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An electromagnetic stylus comprising:
   a hollow body;
   a pen-nib device disposed at one end of the hollow body;
   an energy transforming device disposed in the hollow body for converting variations in a physical quantity into electrical signals, the energy transforming device comprising:
      a coil;
      a magnet movably disposed through the coil for moving back and forth relative to the coil so as to make the coil generate the electrical signals; and
      first and second piezoelectric films respectively disposed on the hollow body corresponding to two ends of the coil, for receiving impact of the magnet to generate the electrical signals;
   a circuit board disposed in the hollow body and electrically connected to the energy transforming device for rectifying the electrical signals transformed by the energy transforming device; and
   an electricity storage device disposed in the hollow body and electrically connected to the pen-nib device and the circuit board, for receiving the electrical signals transmitted from the circuit board to generate electrical energy and providing the electrical energy to the pen-nib device to generate electromagnetic signals.

2. The electromagnetic stylus of claim 1, wherein the energy transforming device further comprises at least one buffer member disposed on at least one end of the magnet.

3. The electromagnetic stylus of claim 2, wherein the buffer member is a rubber buffer pad or a spring.

4. The electromagnetic stylus of claim 1 further comprising:
   a cap disposed on another end of the hollow body opposite to the pen-nib device for containing the energy transforming device, the circuit board, and the electricity storage device with the hollow body.

5. The electromagnetic stylus of claim 1, wherein the electricity storage device is a capacitance device.

6. A computer apparatus comprising:
   a computer module comprising:
      a casing having a containing slot;
      a host device disposed in the casing;
      at least one heat dissipating sheet disposed on the host device; and
      a heat conductive strip disposed on the heat dissipating sheet; and
   an electromagnetic stylus detachably disposed in the containing slot, the electromagnetic stylus comprising:
      a hollow body comprising:
         a heat dissipating casing;
         a heat absorbing casing for contacting the heat conductive strip when the electromagnetic stylus is disposed in the containing slot, so as to receive thermal energy transmitted from the heat dissipating sheet via the heat conductive strip; and a heat insulation ring disposed on the heat absorbing casing and the heat dissipating casing for preventing the heat absorbing casing from contacting the heat dissipating casing;

a pen-nib device disposed on an end of the heat absorbing casing;

a thermal energy conversion chip disposed between the heat absorbing casing and the heat dissipating casing, for absorbing thermal energy generated by temperature difference between the heat absorbing casing and the heat dissipating casing to generate electrical signals;

a circuit board disposed in the hollow body and electrically connected to the thermal energy conversion chip for rectifying the electrical signals transformed by the thermal energy conversion chip; and an electricity storage device disposed in the hollow body and electrically connected to the pen-nib device and the circuit board, for receiving the electrical signals transmitted from the circuit board to generate electrical energy and providing the electrical energy to the pen-nib device to generate electromagnetic signals.

7. An electromagnetic stylus comprising:

a hollow body;

a pen-nib device disposed at one end of the hollow body;

an energy transforming device disposed in the hollow body for converting variations in a physical quantity into electrical signals, the energy transforming device comprising:

an energy generating motor having a rotating shaft;

a mass disposed on the rotating shaft; and a friction cover disposed on the mass and rotatably disposed on another end of the hollow body opposite to the pen-nib device, for driving the mass to rotate with the rotating shaft, so as to make the energy generating motor generate the electrical signals;

a circuit board disposed in the hollow body and electrically connected to the energy transforming device for rectifying the electrical signals transformed by the energy transforming device; and an electricity storage device disposed in the hollow body and electrically connected to the pen-nib device and the circuit board, for receiving the electrical signals transmitted from the circuit board to generate electrical energy and providing the electrical energy to the pen-nib device to generate electromagnetic signals.

8. The electromagnetic stylus of claim 7, wherein the friction cover is made of material with a high friction coefficient.

9. An electromagnetic stylus comprising:

a hollow body;

a pen-nib device disposed at one end of the hollow body;

an energy transforming device disposed in the hollow body for converting variations in a physical quantity into electrical signals, the energy transforming device comprising:

an energy generating motor having a rotating shaft; and an eccentric mass disposed on the rotating shaft, and the energy generating motor being used for generating the electrical signals by utilizing the eccentric mass to rotate the rotating shaft or by rotating relative to the eccentric mass via the rotating shaft with rotation of the hollow body;

a circuit board disposed in the hollow body and electrically connected to the energy transforming device for rectifying the electrical signals transformed by the energy transforming device; and an electricity storage device disposed in the hollow body and electrically connected to the pen-nib device and the circuit board, for receiving the electrical signals transmitted from the circuit board to generate electrical energy and providing the electrical energy to the pen-nib device to generate electromagnetic signals.

10. The electromagnetic stylus of claim 9 further comprising:

a cap disposed on another end of the hollow body opposite to the pen-nib device, for containing the energy transforming device, the circuit board, and the electricity storage device with the hollow body.

11. An electromagnetic stylus comprising:

a hollow body;

a pen-nib device disposed at one end of the hollow body;

an energy transforming device disposed in the hollow body for converting variations in a physical quantity into electrical signals, the energy transforming device comprising:

a support base disposed on the hollow body;

at least one first piezoelectric strip disposed on the support base; and at least one mass disposed on a top end of the first piezoelectric strip, for driving the first piezoelectric strip to swing relative to the support base to generate the electrical signals;

a circuit board disposed in the hollow body and electrically connected to the energy transforming device for rectifying the electrical signals transformed by the energy transforming device; and an electricity storage device disposed in the hollow body and electrically connected to the pen-nib device and the circuit board, for receiving the electrical signals transmitted from the circuit board to generate electrical energy and providing the electrical energy to the pen-nib device to generate electromagnetic signals.

12. The electromagnetic stylus of claim 11, wherein the energy transforming device further comprises:

at least one elastic strip disposed on the support base and located at least one side of the first piezoelectric strip, for providing elastic force to the mass so as to increase the swing times of the first piezoelectric strip.

13. The electromagnetic stylus of claim 12, wherein the elastic strip is disposed on the support base in a manner of bending outwardly relative to the first piezoelectric strip.

14. The electromagnetic stylus of claim 12, wherein the elastic strip is made of elastic piezoelectric material and electrically connected to the circuit board.

15. The electromagnetic stylus of claim 11, wherein the energy transforming device further comprises:

at least one second piezoelectric strip disposed on the support base, electrically connected to the circuit board, and located on at least one side of first piezoelectric strip for receiving impact of the mass, so that the second piezoelectric strip swings relative to the support base together with the first piezoelectric strip to generate the electrical signals.

16. The electromagnetic stylus of claim 11, wherein the hollow body has a sliding slot formed thereon, the energy transforming device further comprises a push button, and the push button is connected to the support base and movably disposed on the sliding slot for pushing the support base along the sliding slot to make the first piezoelectric strip and the mass protrude from the hollow body or contained in the hollow body.

17. The electromagnetic stylus of claim 11 further comprising:
a cap disposed on another end of the hollow body opposite to the pen-nib device for containing the energy transforming device, the circuit board, and the electricity storage device with the hollow body.

18. An electromagnetic stylus comprising:
a hollow body comprising a heat absorbing casing, a heat dissipating casing, and a heat insulation ring ;
a pen-nib device disposed on a first end of the heat absorbing casing, the heat insulation ring being disposed between a second end of the heat absorbing casing and the heat dissipating casing for preventing the heat absorbing casing from contacting the heat dissipating casing,;
an energy transforming device disposed in the hollow body for converting variations in a physical quantity into electrical signals, the energy transforming device comprising:
a thermal energy conversion chip connected between the heat absorbing casing and the heat dissipating casing for absorbing thermal energy generated by temperature difference between the heat absorbing casing and the heat dissipating casing to generate the electrical signals;
a circuit board disposed in the hollow body and electrically connected to the energy transforming device for rectifying the electrical signals transformed by the energy transforming device; and
an electricity storage device disposed in the hollow body and electrically connected to the pen-nib device and the circuit board, for receiving the electrical signals transmitted from the circuit board to generate electrical energy and providing the electrical energy to the pen-nib device to generate electromagnetic signals.

* * * * *